United States Patent [19]

Gellner et al.

[11] 3,990,620
[45] Nov. 9, 1976

[54] INSTALLATION FOR THE AUTOMATIC FEED OF WELDING WIRES

[75] Inventors: Otmar Gellner, Seulberg; Willi Ernst, Neu-Anspach, both of Germany

[73] Assignee: Daimler-Benz Aktiengesellschaft, Germany

[22] Filed: Oct. 18, 1974

[21] Appl. No.: 515,994

[30] Foreign Application Priority Data

Oct. 20, 1973 Germany............................ 2352714

[52] U.S. Cl..................................... 228/7; 228/10
[51] Int. Cl.² ......................................... B23K 37/00
[58] Field of Search ................... 228/7, 4, 8, 9, 10, 228/12, 18, 25, 26, 43

[56] References Cited
UNITED STATES PATENTS

| | | | |
|---|---|---|---|
| 1,932,263 | 10/1933 | Chapman.............................. | 29/100 |
| 3,837,559 | 9/1974 | Greenberger.......................... | 228/4 |

*Primary Examiner*—Al Lawrence Smith
*Assistant Examiner*—Margaret Joyce
*Attorney, Agent, or Firm*—Craig & Antonelli

[57] ABSTRACT

An installation for the automatic feed of welding wires for a welding torch provided for the treatment of workpieces, in which means are provided to weld together the welding wires supplied in rod shape in a fully automatic manner by welding the same together into an endless rod with simultaneous continued forward movement of the welding wires in the direction toward the welding torch.

15 Claims, 1 Drawing Figure

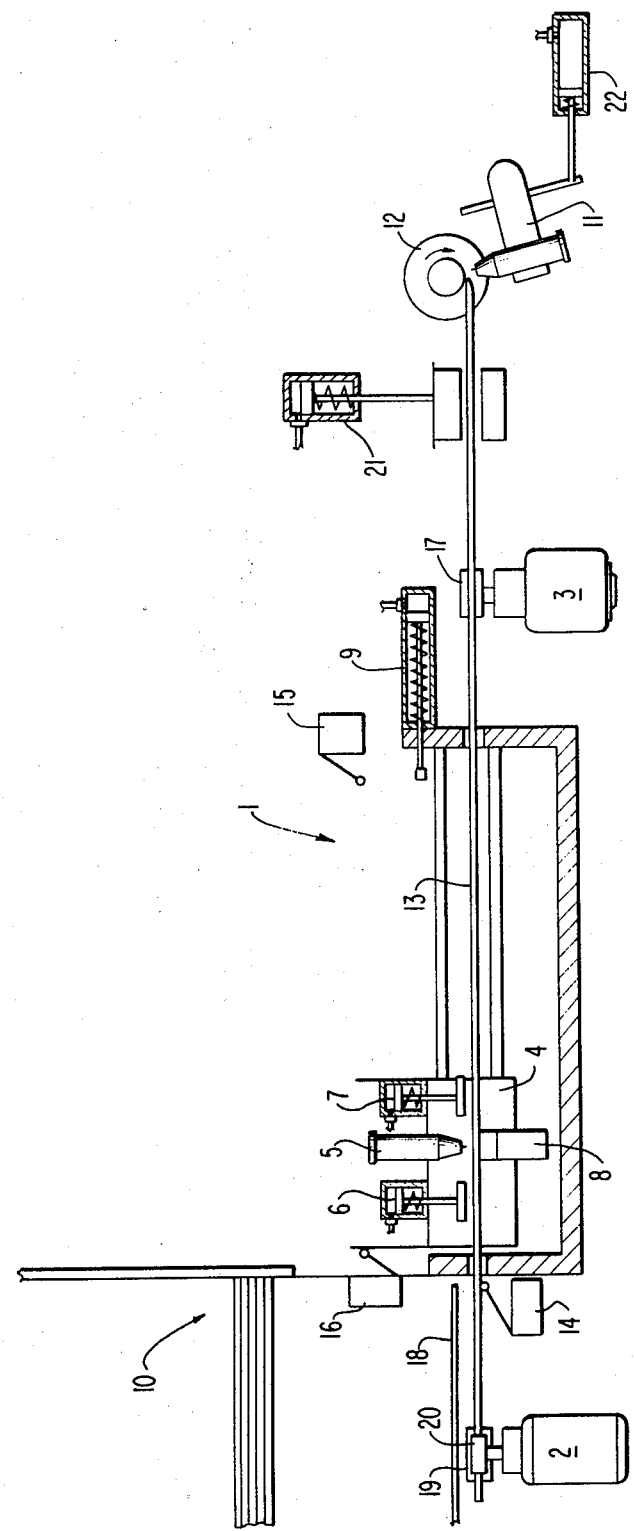

INSTALLATION FOR THE AUTOMATIC FEED OF WELDING WIRES

The present invention relates to an installation for the automatic feed of welding wires for a welding torch or burner provided for the treatment of workpieces.

With the prior art welding installations, the operating cycle had to be interrupted after the termination of the workpiece welding operation, while welding together two rod-shaped welding wires. The periods of standstill or shut-down thus conditioned by the welding together of the rods did not permit a more rational output of the workpieces to be treated.

It is the aim of the present invention to avoid this disadvantage in an advantageous manner.

The underlying problems are solved according to the present invention in that means are provided which connect with each other the welding wires supplied in rod shape, especially non-bendable welding wires, fully automatically one after the other by welding the same together into an endless rod—with simultaneous continuous forward movement of the welding wires in the direction toward the welding torch or welding burner.

The fully automatic operation of such welding installations with rod-shaped welding wires enables a multi-machine attendance by a single person, which signifies a personnel reduction with at least identical welding capacity.

The welding wires which are used only for the treatment or finishing of high alloyed workpieces or workpieces with a high carbon content, are constructed rod-shaped for the reason that they consist of a material matched to the workpiece and thus non-bendable, which cannot be rolled up into a welding wire roll as otherwise customary.

According to the present invention, a second welding wire is pushed against the first welding wire which is located nearer the workpiece. Furthermore, both welding wires are fixed for a short period of time onto a carriage during the initiation of the welding-together operation within the area of the welding place without impairment of the forward movement.

Provision is made as a further feature according to the present invention that one feed or advance motor each, equipped with a feed roller, is provided for the first welding wire and for the second welding wire and a longitudinally displaceable conveying or transporting carriage with two clamping cylinders operating independently of one another for fixing the first and the second welding wire is arranged between these two motors.

Furthermore, it is proposed according to the present invention that a welding torch or burner is secured on the conveying or transporting carriage intermediate the clamping cylinders which welds together the welding wire ends and in that a sensing or detecting device of conventional type rigidly connected with the conveying carriage and disposed opposite the welding torch, preferably a light gate consisting of a light emitter and light receiver is provided, which influences, on the one hand, the first clamping cylinder and, on the other, the second clamping cylinder and the advancing or feed motor.

Accordingly, it is an object of the present invention to provide a welding installation which avoids by simple means the aforementioned shortcomings and drawbacks encountered in the prior art.

Another object of the present invention resides in an installation for the automatic feed of welding wires which permits a more rational output of the workpieces with simultaneous reduction in attending personnel.

A further object of the present invention resides in an installation for the automatic feed of welding wires consisting of individual, substantially non-bendable rods which permits the full automation of the feed of such rods by welding the same together into an endless rod.

Still a further object of the present invention resides in a welding installation of the type described which is simple in construction yet highly reliable in operation for its intended purposes.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of one embodiment of an automatic feed system in accordance with the present invention for automatically feeding and connecting together welding wires.

Referring now to the single FIGURE of the drawing for purposes of treating or finishing, for example, valves of internal combustion engines, an installation generally designated by reference numeral 1 is provided which essentially consists of two feed motors 2 and 3 and of a conveying or transporting carriage 4 longitudinally displaceably arranged between the motors 2 and 3, on which are mounted a welding torch or burner 5, two clamping cylinders 6 and 7 disposed in front and to the rear thereof and a light gate 8 arranged opposite the welding torch 5. Furthermore, a return mechanism 9 of conventional construction which is provided for the transporting or conveying carriage 4 is located in front of the feed motor 3.

A welding wire magazine or store generally designated by reference numeral 10 with a means (not shown) for separating out individual welding wires and feeding them one at a time to the installation 1, is disposed in front of the installation 1, whereas a pivotal welding burner or torch 11 for the treatment or finishing of the valves is arranged at the end of the installation 1. Within the area of the valve seat, a wear-resistant material is welded onto the valves 12.

OPERATION

The operation of the entire installation will be described more fully hereinafter.

Workpiece 12, welding torch 11 and inserted rod-shaped welding wire 13 are in the welding position. All of the limit switches 14, 15, and 16 provided in the installation 1 are actuated. The welding current generators, the supply of argon, cooling water and compressed air are all turned on.

As soon as the electric arc is struck at the welding torch 11, the feed motor 3 together with the feed roller 17 starts to rotate and pushes the first welding wire 13 into the electric arc. If the end of the welding wire 13 passes the limit switch 14, then a new second welding wire 18 is removed from the welding wire magazine 10 and is placed onto the feed roller 19 of the feed motor 2. After this operation, the end switch 14 is again actuated and initiates the return of the arms (not shown) forming part of the means for separating the wires in the magazine 10 and feeding the same as individual wires onto the feed roller 19. Since such mechanisms are known as such, a detailed description thereof is dispensed with herein for the sake of simplicity. The welding wire 13 is continuously further advanced during this period of time by means of the rotating feed roller 17. If the end of welding wire 13 reaches the light gate 8 consisting of light emitter and light receiver, then the light beam interrupted up to that time impinges against the oppositely disposed light receiver which engages by way of a time-delay relay the clamping cylinder 7 and clamps the welding wire 13 onto the conveying carriage 4 which is taken along at the feed velocity of the welding wire 13. In order that the operation is not disturbed by the resulting electric arc at the welding-together torch 5, a shield may be pivoted in front of the light receiver prior to the occurrence of the electric arc which prevents the destruction of the photoelectric cell.

The return mechanism 9 is simultaneously shifted back by means of the light pulse. Additionally, a clamping cylinder 20 cooperating with the feed roller 19 clamps the second welding wire 18 onto the feed roller 19 which subsequently advances the welding wire 18 with three times the velocity as compared to the feed velocity of the welding wire 13. Upon reaching the light gate 8, the light beam is interrupted. As a result thereof, the feed motor 2 is de-energized. Simultaneously, the clamping cylinder 6 clamps the welding wire 18 onto the conveying carriage 4. After the clamping operation, the welding operation for connecting together the two welding wire ends is initiated by a pressure switch of conventional construction (not shown). The welding period of time amounts to about three seconds. After the completed welding together operation, the conveying carriage 4 is at first continued to be pulled forward by the welding wire 13 until the limit switch 15 is reached. The latter disengages all of the clamping cylinders. Thereupon, the return mechanism 9 pushes the conveying carriage 4 into the starting position up to the limit switch 16 whereas the welding wire 13 which is now connected to the welding wire 18, continues to move forward.

The welding operation repeats in a similar manner when the end of the welding wire 18 reaches the limit switch 14.

By the use of the installation 1, the welding together of the welding wires can take place also during the welding operation of the workpiece.

After completed finishing or treating of the workpiece, a welding wire deflecting cylinder 21 as well as a welding torch deflecting cylinder 22 deflect for a short period of time up to the emplacement of a new workpiece. Only during this period of time, the operation of the installation is brought to a standstill temporarily.

A change of the welding wire velocity has no influence on the functioning of the welding installation since the same adapts itself automatically to the changed feed velocity of the welding wire.

The use of different welding wire diameters as well as unassorted manufacturing lengths of these rod-shaped wires do not limit in any way whatsoever the operational readiness of the fully automatic installation.

The installation can be used in all cases where welding rods have to be processed by means of semi- or fully automatic welding installations. Furthermore, the installation of the present invention can be used both for oxy-acetylene welding systems as well as for electric welding systems.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the automatic feed of rod-shaped welding wires for a welding burner provided for the treatment of workpieces, characterized in that means are provided for aligning adjoining adjacent ends of the welding wires, means are provided for successively welding the aligned adjacent ends of the wires fully automatically one after the other into an endless rod, and means are provided for selectively displacing said welding means at least along a portion of a feed path of the welding wires, whereby a simultaneous continuous forward movement of the welding wires in the direction of the welding burner is effected during the welding of the aligned ends of the welding wires.

2. An installation according to claim 1, characterized in that the welding wires are substantially non-bendable welding wires.

3. An installation according to claim 1, characterized by means for pushing an end of a second welding wire against an end of the first welding wire located nearer the workpiece, and means for temporarily fixing the respective aligned abutting ends of the two welding wires during the initiation of the welding-together operation within the area of the welding place substantially without impairment of the forward movement thereof.

4. An installation for the automatic feed of welding wires for a welding burner provided for the treatment of workpieces, characterized in that means are provided which connect with each other the welding wires which are supplied in rod-shape, fully automatically one after the other by successively welding the same together into an endless rod with simultaneous continuous forward movement of the welding wires in the direction of the welding burner, means for pushing a second welding wire against the first welding wire which is located nearer the workpiece, means for temporarily fixing the two welding wires during the initiation of the welding-together operation within the area of the welding place substantially without impairment of the forward movement thereof, and in that one feed motor with a feed roller means is provided for feeding the first welding wire, said means for pushing include a second feed motor with a feed roller means for feeding the second welding wire, and in that said means for temporarily fixing the two welding wires is a longitudinally displaceable conveying carriage means with two clamping cylinder means operable independently of one another for fixing the first and second welding wire, said conveying carriage means is arranged between said first and second motors.

5. An installation according to claim 4, characterized in that a welding burner means welding together the welding wire ends is secured on the carriage means intermediate the clamping cylinder means and in that a detecting means securely connected with the carriage means is provided opposite the welding burner means, said detecting means being operable to influence, on the one hand, the clamping cylinder means for the first welding wire rod and, on the other, the clamping cylinder means for the second welding wire rod and the motor thereof.

6. An installation according to claim 5, characterized in that said detecting means includes a light gate with a light emitter and a light receiver.

7. An installation according to claim 5, characterized in that the carriage means is taken along at the advance velocity of the first welding wire when the end of the first welding wire leaves the detecting means which causes the clamping of the first welding wire to the carriage means, whereas prior to the initiation of the welding-together operation the second welding wire is advanced with a velocity that is a multiple with respect to the velocity of the first welding wire and upon reaching the detecting means is being clamped to the carriage means by the other clamping cylinder means directly in front of the first welding wire with substantially simultaneous de-energization of the feed motor cooperating with the second welding wire.

8. An installation according to claim 7, characterized by a return means which is operable after a completed welding-together operation of the welding wires and after release of both clamping cylinder means to return the carriage means to its original position.

9. An installation according to claim 8, characterized in that the welding wires are substantially non-bendable welding wires.

10. An installation according to claim 9, characterized in that said detecting means includes a light gate with a light emitter and a light receiver.

11. An installation for the automatic feed of welding wires for a welding burner provided for the treatment of workpieces, characterized in that means are provided which connect with each other the welding wires which are supplied in rod-shape, fully automatically one after the other by welding the same together into an endless rod with simultaneous continuous forward movement of the welding wires in the direction of the welding burner, and in that one feed motor with a feed roller means is provided for feeding the first welding wire, a second feed motor with a feed roller means is provided for feeding the second welding wire, and in that a longitudinally displaceable conveying carriage means with two clamping cylinder means operable independently of one another for fixing the first and the second welding wire is arranged between said first and second motors.

12. An installation according to claim 11, characterized in that a welding burner means welding together the welding wire ends is secured on the carriage means intermediate the clamping cylinder means and in that a detecting means securely connected with the carriage means is provided opposite the welding burner means, said detecting means being operable to influence, on the one hand, the clamping cylinder means for the first welding wire rod and, on the other, the clamping cylinder means for the second welding wire rod and the motor thereof.

13. An installation according to claim 12, characterized in that said detecting means includes a light gate with a light emitter and a light receiver.

14. An installation according to claim 12, characterized in that the carriage means is taken along at the advance velocity of the first welding wire when the end of the first welding wire leaves the detecting means which causes the clamping of the first welding wire to the carriage means, whereas prior to the initiation of the welding-together operation the second welding wire is advanced with a velocity that is a multiple with respect to the velocity of the first welding wire and upon reaching the detecting means is being clamped to the carriage means by the other clamping cylinder means directly in front of the first welding wire with substantially simultaneous de-energization of the feed motor cooperating with the second welding wire.

15. An installation according to claim 11, characterized by a return means which is operable after a completed welding-together operation of the welding wires and after release of both clamping cylinder means to return the carriage means to its original position.

* * * * *